(12) United States Patent
Osterfeld

(10) Patent No.: US 9,193,324 B2
(45) Date of Patent: Nov. 24, 2015

(54) AIRBAG MODULE AND MODULE HOUSING

(71) Applicant: TK Holdings Inc., Auburn Hills, MI (US)

(72) Inventor: Douglas L. Osterfeld, Waterford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/311,815

(22) Filed: Jun. 23, 2014

(65) Prior Publication Data

US 2014/0375024 A1 Dec. 25, 2014

Related U.S. Application Data

(60) Provisional application No. 61/838,204, filed on Jun. 21, 2013.

(51) Int. Cl.
*B60R 21/16* (2006.01)
*B60R 21/217* (2011.01)

(52) U.S. Cl.
CPC ..... *B60R 21/2176* (2013.01); *B60R 2021/2172* (2013.01); *B60R 2021/2178* (2013.01)

(58) Field of Classification Search
USPC ...... 280/728.1, 728.2, 728.3, 743.1
See application file for complete search history.

(56) References Cited

U.S. PATENT DOCUMENTS

| | | | | |
|---|---|---|---|---|
| 5,335,937 A * | 8/1994 | Uphues et al. | ............. | 280/728.3 |
| 5,676,393 A * | 10/1997 | Rose | ............. | 280/728.3 |
| 6,056,313 A * | 5/2000 | Lutz et al. | ............. | 280/728.1 |
| 6,669,226 B2 * | 12/2003 | Fowler et al. | ............. | 280/728.2 |
| 6,802,526 B2 * | 10/2004 | Dumbrique et al. | ....... | 280/728.2 |
| 7,029,026 B2 * | 4/2006 | Morita | ............. | 280/728.3 |
| 7,543,844 B2 * | 6/2009 | Rose et al. | ............. | 280/728.2 |
| 2004/0124617 A1 * | 7/2004 | Morita | ............. | 280/732 |
| 2005/0258624 A1 * | 11/2005 | Abraham et al. | .......... | 280/728.3 |
| 2008/0100044 A1 * | 5/2008 | Cho | ............. | 280/730.2 |
| 2009/0250909 A1 | 10/2009 | Kuhne et al. | | |
| 2010/0244410 A1 | 9/2010 | Chavez et al. | | |
| 2011/0227318 A1 | 9/2011 | Schorle et al. | | |

* cited by examiner

*Primary Examiner* — Toan To
(74) *Attorney, Agent, or Firm* — L.C. Begin & Associates, PLLC.

(57) ABSTRACT

A housing for an airbag module includes an extrusion incorporating a body portion and a cover extruded integrally with the body portion so as to form a single monolithic unit.

20 Claims, 7 Drawing Sheets

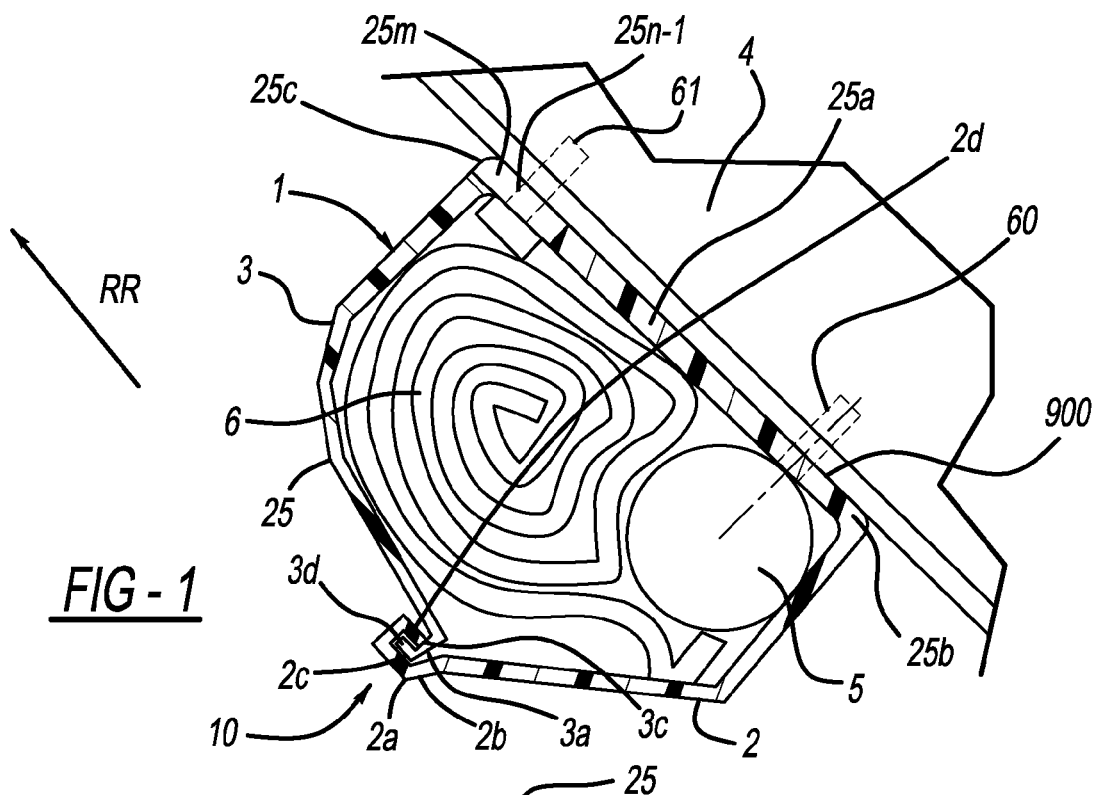
FIG-1
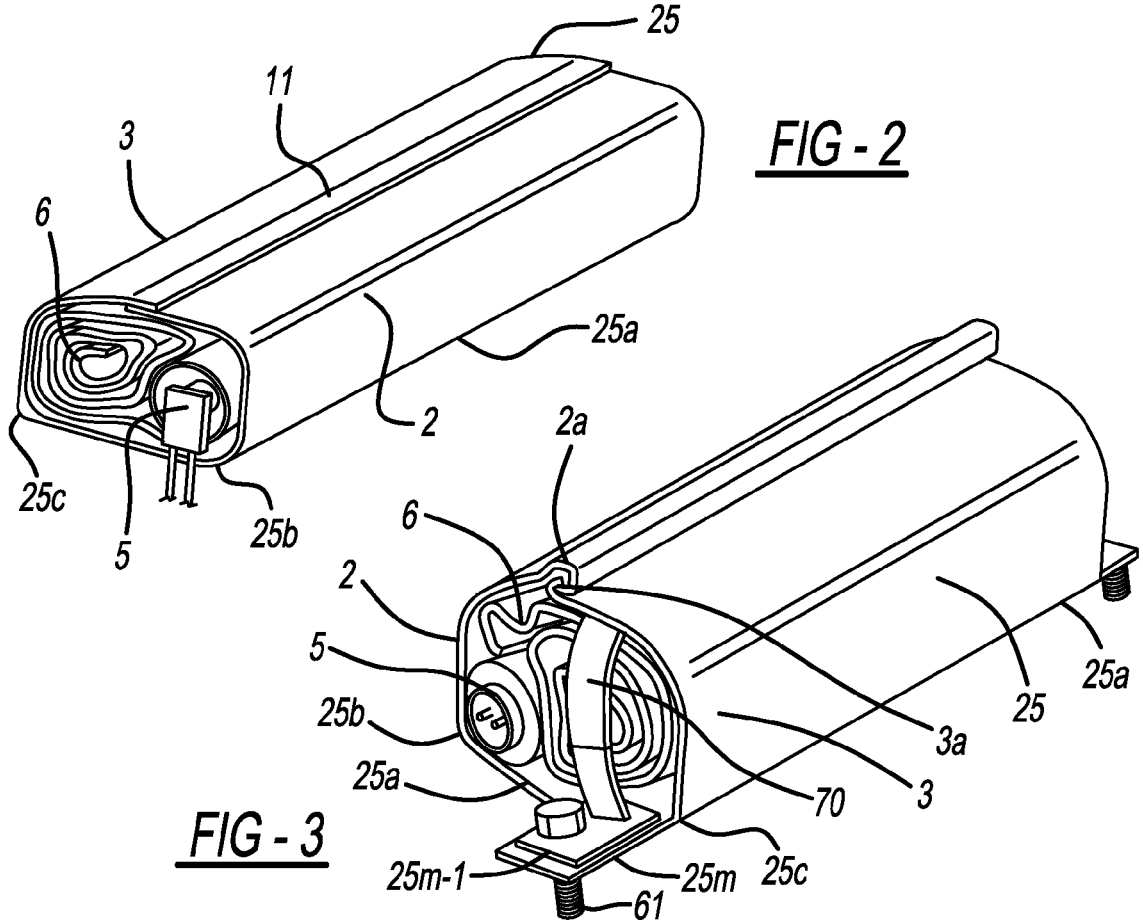
FIG-2
FIG-3

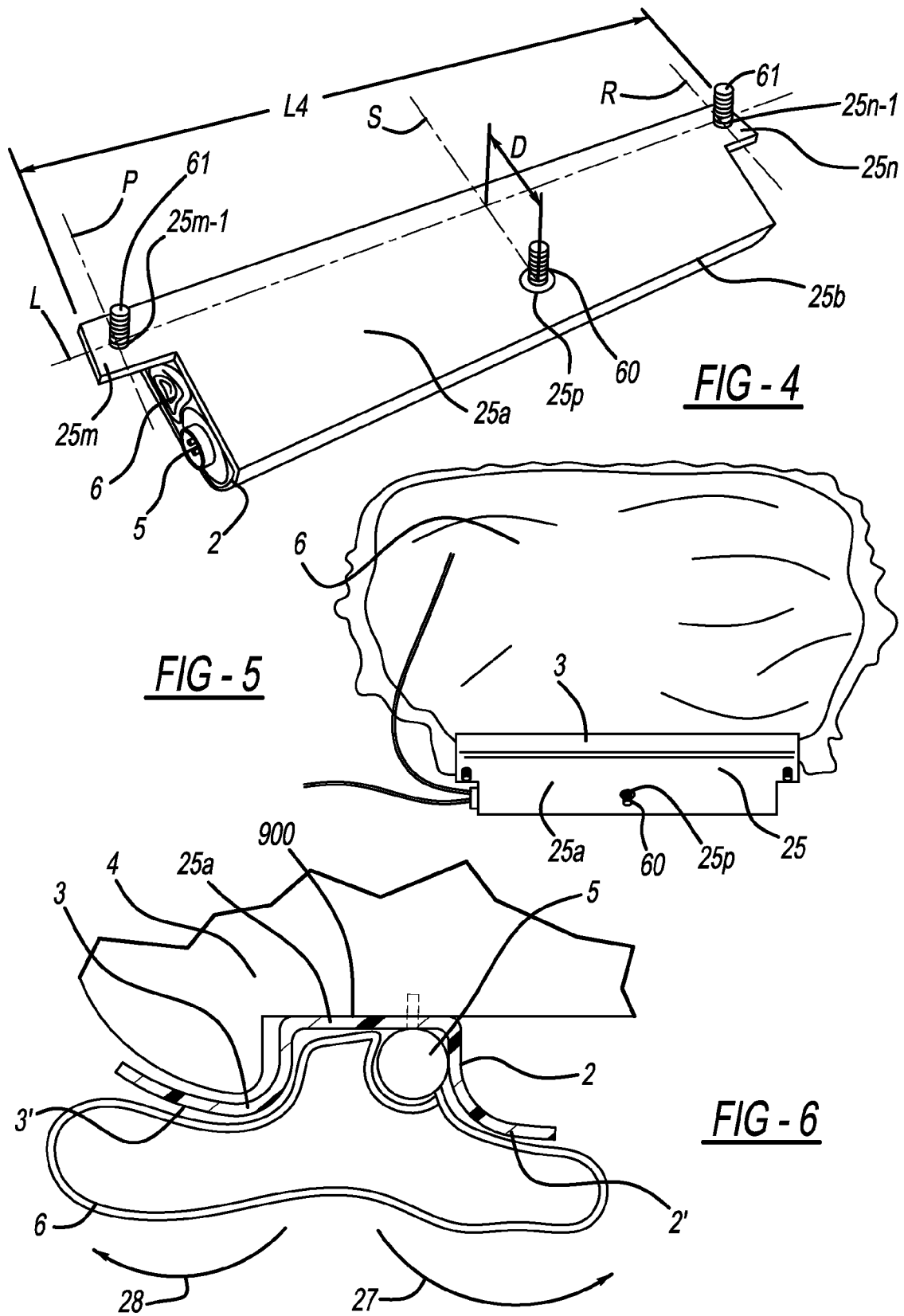

AIRBAG MODULE AND MODULE HOUSING

CROSS-REFERENCE TO RELATED APPLICATIONS

This application claims the benefit of U.S. Provisional Application Ser. Nos. 61/838,204, filed on Jun. 21, 2013, the disclosure of which is incorporated herein by reference in its entirety.

BACKGROUND

This application relates generally to the field of driver and passenger protection devices in automobiles.

Airbag modules may be mounted in an interior of a vehicle. The airbag module generally includes a housing containing an airbag structured to deploy to cushion body portions of a vehicle occupant, in the event of a vehicle collision. Generally, the housing provides a mounting structure for securing the module components with respect to each other and for mounting the module components to the vehicle. The housing may need to reliably secure the airbag therein prior to airbag deployment. The housing also needs to reliably open so as to release the airbag during deployment.

Previously, module housings have been produced by such processes as injection molding and stamping. However, these processes may generate excessive scrap. Also, the requirements of processing the housing materials may necessitate thicker cross-sections than would otherwise be necessary, thereby increasing part weight and cost.

In addition, the housing generally includes a body and a cover applied to the body to retain the module components within the housing for installation in the vehicle and until airbag deployment. In fabricating the housing using injection molding and stamping processes, it has been necessary to form the cover separate from the body. This increases tooling, manufacturing and inventory costs and may also complicate module assembly.

In view of the above, an ongoing need exists for improved module and housing structures that meet manufacturing and operational requirements.

SUMMARY OF THE INVENTION

In one aspect of the embodiments described herein, a housing for an airbag module is provided. The housing includes an extrusion incorporating a body portion and a cover extruded integrally with the body portion so as to form a single monolithic unit. At least one foldable end wall is formed proximate an end of the housing.

In another aspect of the embodiments of the described herein, a housing for an airbag module is provided. The housing includes an extrusion incorporating a body portion and a cover extruded integrally with the body portion so as to form a single monolithic unit. At least one foldable flap is formed proximate an end of the housing. The at least one flap and the cover are structured to engage each other in a closed condition of the housing such that the at least one flap forms and end wall of the housing.

BRIEF DESCRIPTION OF THE DRAWINGS

The accompanying drawings, which are incorporated in and constitute a part of this specification, illustrate embodiments of the invention and together with the description serve to explain principles of the invention.

FIG. 1 is a cross-sectional side view of one embodiment of an airbag module attached to a portion of a vehicle interior, and showing one embodiment of a disengagegable connecting means for connecting portions of the housing prior to airbag deployment.

FIG. 2 is a perspective view of another embodiment of an airbag module.

FIG. 3 is a perspective view of a portion of the airbag module shown in FIG. 1, shown detached from the vehicle.

FIG. 4 is a perspective view of the airbag module shown in FIG. 1 showing a portion of the module used for mounting to a vehicle.

FIG. 5 is a plan view of the airbag module shown in FIG. 1 after deployment of an airbag contained in the module.

FIG. 6 is a cross-sectional side view of the airbag module shown in FIG. 1 during deployment of the airbag.

DETAILED DESCRIPTION

Figure 2A:
FIG. 2A is a cross-sectional view of a portion of an airbag module housing showing an alternative embodiment of a disengagegable connecting means for connecting portions of the housing prior to airbag deployment.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

Embodiments will be described with reference to the accompanying drawings. FIG. 1 shows a portion of a vehicle located in the occupant compartment of the vehicle, including an airbag module 1. The airbag module 1 includes an inflator 5, an airbag 6, and a module housing 25. A body portion 25a of the housing 25 is mounted to a suitably located panel 4 or other portion of the vehicle interior using suitable mounting hardware.

In the embodiments described herein, housing 25 is formed using an extrusion process. This type of process is known in the art. Depending on the requirements of a particular design, secondary operations (such as die cutting, for example) may be performed on the housing after extrusion.

Also, in the embodiments described herein, housing 25 has body portion 25a and a cover (generally designated 10) extruded integrally with the body portion 25a so as to form a single monolithic unit. As used herein, the term "monolithic" means that the housing is extruded as a single piece. Thus, in the embodiments shown, body portion 25a, first portion 2 and second portion 3 as described below are formed as a single, unitary piece.

Figure 9:
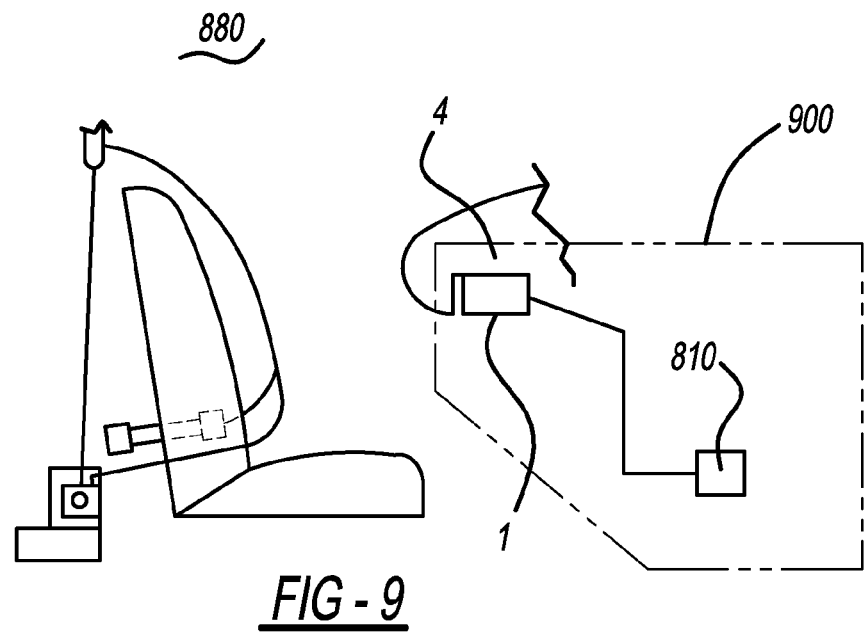
FIG. 9 is a schematic view of a portion of a vehicle occupant protection system installed in a vehicle and incorporating an airbag module 1 in accordance with an embodiment described herein.

In the embodiment shown in FIGS. 1-6, cover 10 includes a first portion 2 extending from a first edge 25b of the body portion, and a second portion 3 extending from a second edge 25c of the body portion opposite the first edge. In FIG. 1, body portion 25a is planar and is structured for mounting to a mounting surface 900 of the panel 4 such that the body portion extends along and contacts the mounting surface. In FIG. 1, the mounting surface 900 to which the body portion 25a is secured is shown residing at an angle with respect to the horizontal. However, the body portion may be secured to a horizontal mounting surface (such as shown in FIG. 9), a vertical mounting surface, or a mounting surface oriented at any angle needed to achieve a desired airbag deployment direction, depending on the requirements of a particular application.

In particular embodiments, the housing is extruded from a polymeric material. Polymers suitable for use in the housing embodiments described herein will generally have superior low-temperature flexural properties. One example of a polymer suitable for use in the housing embodiments described herein is Adflex KSO21P Polyolefin from LyondellBassell Industries. One suitable source for this material is Gemini Plastics located in Ubly, Mich. However, any of the housing portions 25a, 2 and 3 may be formed from any material suitable for the purposes described herein.

In one embodiment, at least the one of housing portions 2 and 3 positioned farthest from the inflator 5 (for example, housing second portion 3 in the embodiment shown in FIG. 6) is also structured to resiliently bend downwardly and outwardly as shown in FIG. 6, responsive to forces exerted by an inflating airbag positioned in the housing. This resiliently bendable portion of the housing thereby acts as a ramp to guide the airbag from a stored position into the occupant compartment. In particular embodiments, housing second portion 3 bends in the direction indicated by arrow RR (towards the rear of the vehicle, as shown in FIG. 1) during airbag deployment. The size or surface area of housing portion 3 acting as a ramp may be adjusted to the particular vehicle application by adjusting the location of the seam formed by the connection between the edges of housing portions 2 and 3. In the particular embodiment shown in FIGS. 1-6, both of housing portions 2 and 3 act as ramps during airbag deployment, in the manner described below.

Figure 13:
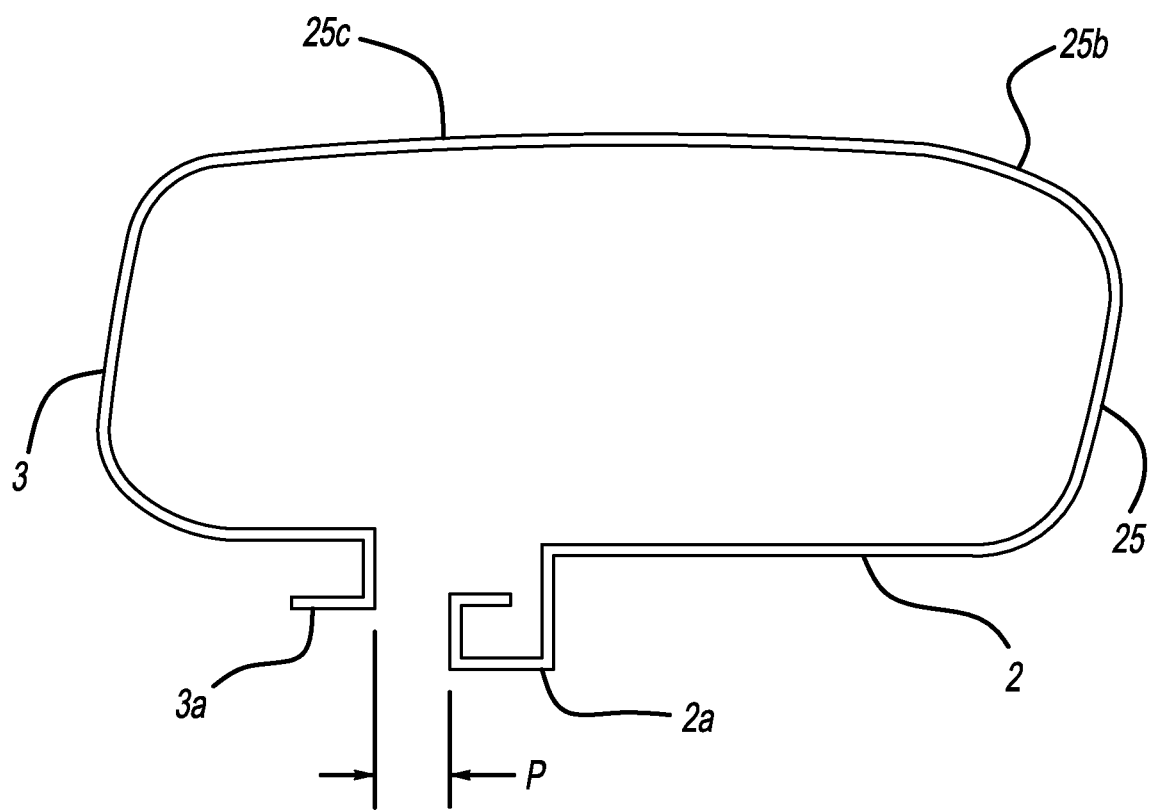
FIG. 13 is an end view of another extruded shape from which an embodiment of the airbag module housing may be formed.

In one embodiment, the housing is extruded in the desired folded or final configuration, but with the free edges of first and second housing portions 2 and 3 separated. In another embodiment, the housing is extruded in the folded configuration shown in FIG. 13, with the extrusion direction extending along an axis pointing into and out of the drawing, and the free edges of first and second housing portions 2 and 3 separated a distance P. In the example shown in FIG. 13, the free edges of first and second housing portions 2 and 3 incorporate respective hook portions 2a and 3a as described in greater detail below. For example, the housing 25 may be extruded in the form shown in FIG. 2, with the housing portion free edges separated. If desired, any disengageable connecting means to be incorporated into the housing may also be extruded integrally with (and during the same process as) the remainder of the housing. If it is desired to provide additional features such as mounting members 25m and 25n (as shown in FIG. 4 and described herein), die-cutting or other suitable post-extrusion operations may be performed on the extruded housing.

In the embodiments described herein, disengageable connecting means are provided for connecting the first portion 2 and the second portion 3 along a seam formed therebetween. The connecting means maintains the connection between the first and second portions 2 and 3 prior to activation of the airbag module and inflation of the airbag. This keeps the folded airbag 6 contained within the module housing 25 prior to module activation. The connecting means is also disengageable responsive to forces exerted by the airbag on the housing portions 2 and 3 during inflation or expansion of the airbag, to release the expanding airbag from the housing. In particular embodiments, the disengageable connecting means are extruded integrally with (and during the same process as) the remainder of the housing.

Referring to FIG. 1, in one embodiment, the first portion 2 and the second portion 3 are joinable or connectible at a seam formed therebetween by any suitable mechanism. For example, the first portion 2 and the second portion 3 may each include a latching or clasping mechanism such as, for example, the curved, interengaging hook portions 2a and 3a shown in FIG. 1 which are configured to clasp together after the folded airbag has been positioned in housing 25. The curved, interengaging hook portions 2a and 3a shown in FIG. 1 may be extruded into and along with the remainder of the housing, as previously described. In the embodiment shown in FIGS. 1 and 3, a hook portion 2a is formed along an edge 2b of first portion 2 and defines a cavity 2c structured for receiving therein a complementary end 3d of a hook portion 3a formed along an edge 3b of second portion 3. Hook portion 2a terminates in an end 2d structured to be insertable inside a cavity 3c formed in a hook portion 3a of housing second portion 3.

As described above, hook portion 3a is formed along an edge 3b of second portion 3 and defines cavity 3c structured for receiving therein a complementary end 2d of hook portion 2a formed along edge 2b of first portion 2. Hook portion 3a terminates in an end 3d structured to be insertable inside cavity 2c formed in a hook portion 2a of housing first portion 2. The folded airbag is positioned within the housing 25 and first and second housing portions 2 and 3 folded over the airbag to enclose the airbag. Housing portions 2 and 3 will contact the airbag and further compress the airbag in the housing as the portions of the clasping mechanism are engaged with each other. The folded airbag will tend to resist further compression by the first and second housing portions 2 and 3 and will exert counter forces on the housing portions resisting engagement of the clasping mechanism components.

Hook portion 2a is structured to enclose the end 3d received therein such that a force exerted by the airbag on housing second portion 3 tends to force hook end 3d deeper into cavity 2c or otherwise into tighter engagement with hook portion 2a. Similarly, hook portion 3a is structured to enclose the end 2d received therein such that a force exerted by the airbag on housing second portion 2 tends to force hook end 2d deeper into cavity 3c or otherwise into tighter engagement with hook portion 3a. Thus, the forces exerted by the compressed airbag on the first and second housing portions 2 and 3 and on the particular clasping mechanism structure shown in FIGS. 1 and 3 aid in securing ends of the housing first and second portions 2 and 3 together prior to airbag deployment.

The clasping mechanism just described is also structured to release or disengage during deployment of the airbag 6 and responsive to the onset of airbag deployment. In this embodiment, a particular embodiment, the clasping mechanism elements are structured to have sufficient stiffness to maintain the locking engagement shown in FIG. 1 and previously described. The clasping mechanism elements are also structured to have sufficient flexibility to deform (if necessary) under loading from the expanding airbag, such that hook end 3*d* disengages from hook portion 2*a* and hook end 2*d* disengages from hook portion 3*a* when the airbag starts to inflate.

Figure 10:
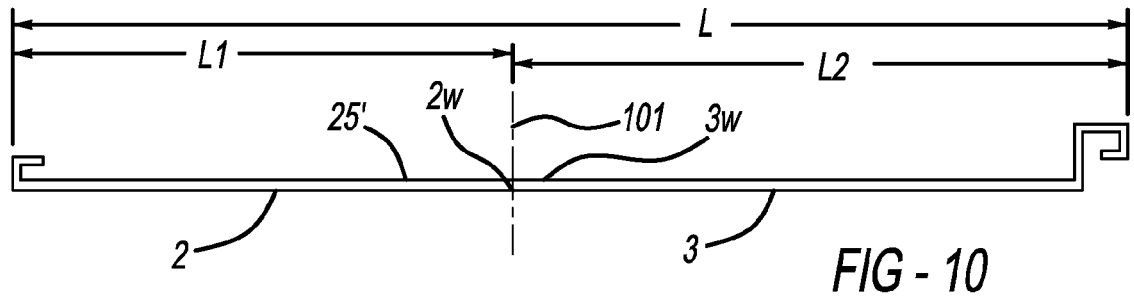
FIG. 10 is an end view of an extruded shape from which an embodiment of the airbag module housing may be formed.
Figure 10A:
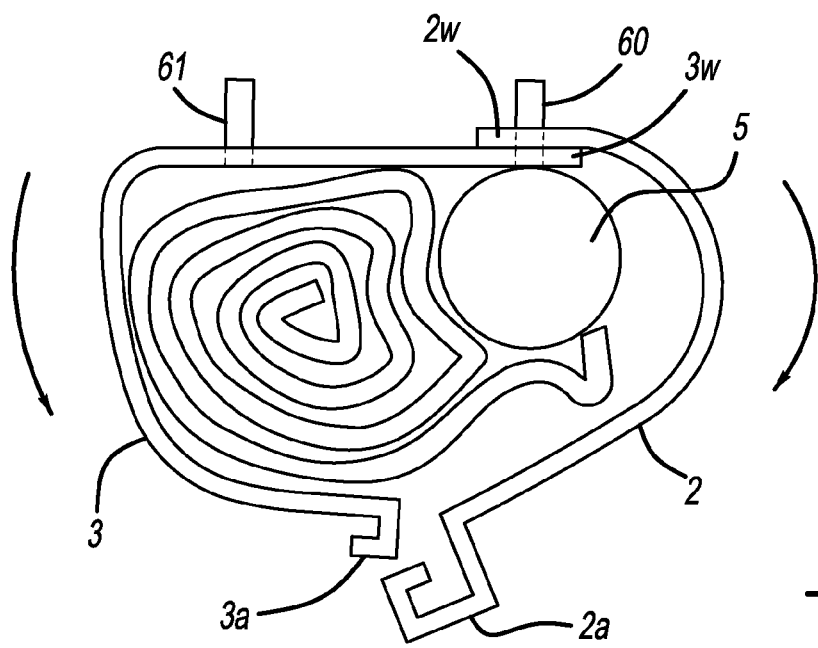
FIG. 10A is a schematic end view of an airbag module fabricated using the housing embodiment shown in FIG. 10.

FIGS. 10 and 10A illustrate a particular embodiment of a method for fabricating a module housing. FIG. 10 is an end view of an extrusion from which an embodiment of the airbag module housing may be formed, with the extrusion direction extending along an axis pointing into and out of the drawing. FIG. 10A is a schematic end view of an airbag module fabricated using the housing embodiment shown in FIG. 10. In FIGS. 10 and 10A, the housing portions have free edges incorporating disengagable connecting means as shown in FIGS. 1 and 3. However, the disengagable connecting means formed along the housing portion edges may have any suitable alternative configuration.

In FIG. 10, a housing blank 25' is extruded from a die along an axis extending perpendicular to the plane of the drawing. After extrusion, blank 25' may be cut along a cut line 101 located so as to provide a desired length L1 of first housing portion 2, and a desired length L2 of second housing portion 3 (where lengths L1 and L2 extend along the plane of the drawing page). First housing portion 2 then terminates in a free edge 2*w*, and second housing portion 3 terminates in a free edge 3*w*. The lengths of the housing portions 2 and 3 are determined by the desired location of the connecting seam between the disengagable connecting means, the particular dimensions of the disengagable connecting features used to connecting the housing portions, and other pertinent factors. In a particular embodiment, the cut line for the free edge 2*w* of first housing portion 2 is spaced apart from the cut line for the free edge 3*w* of second housing portion 3. Thus, the portion of the housing blank between these cut lines is unused in the final housing. This allows greater flexibility in fabricating any of a variety of lengths of the first and second housing portions from a single housing blank.

Referring to FIG. 10A, after the blank 25' has been cut, edges 2*w* and 3*w* may be overlapped and secured together (for example, using fasteners 61 or any other suitable means). The edges of the housing portions incorporating the disengagable connecting means are then mated as described elsewhere herein, after insertion of the module components and folding of the housing portions 2 and 3. The ability to cut each of housing portions 2 and 3 to a desired length allows the location of the connecting seam to be varied along the housing exterior surface, according to the requirements of a particular application. In addition, housings of various sizes can be fabricated from a blank 25' of a single overall length L.

Figure 7:
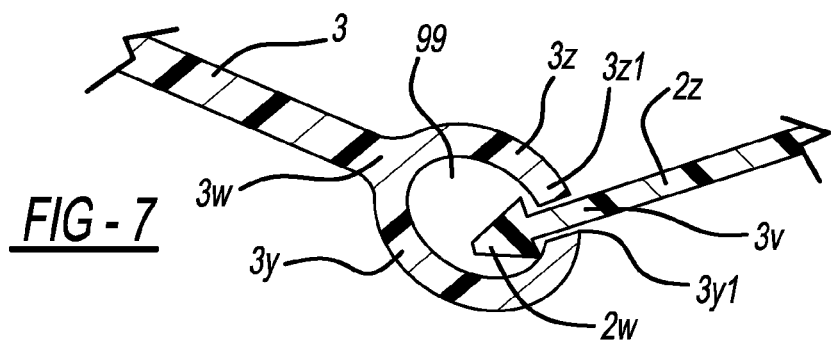
FIG. 7 is a cross-sectional view of a portion of an airbag module housing showing an alternative embodiment of a disengagegable connecting means for connecting portions of the housing prior to airbag deployment.

FIG. 7 is a cross-sectional view of a portion of an airbag module housing showing an alternative embodiment of a disengagable connecting means for connecting portions of the housing prior to airbag deployment. Referring to FIG. 7, in an alternative embodiment, housing second portion 3 is formed such that a pair of opposed, resiliently deflectable wall portions 3*y* and 3*z* extend from and along a free edge 3*w* of the second housing portion 3. Walls 3*y* and 3*z* define a cavity 99 therebetween. Walls 3*y* and 3*z* extend along all or at least a portion of the housing portion edge 3*w* and terminate in free ends 3*z*1 and 3*y*1 which define a gap 3*v* therebetween. In addition, a free edge 2*w* of first housing portion 2 is formed into a tapered, "arrowhead" configuration structured for insertion into the gap 3*v*. As the edge 2*w* is wedged into gap 3*v* and into the cavity 99, wall portions 3*y* and 3*z* deflect and snap back behind edge 2*w* to help retain the edge 2*w* within the cavity 99. At some point during airbag inflation, the airbag exerts sufficient force on the separating housing portions 2 and 3 to produce extraction of edge 2*w* from cavity 99. The elements of the alternative disengagable connecting means just described 1 may be extruded into and along with the remainder of the housing, as previously described.

In particular embodiments, first portion 2 and second portion 3 are formed as a single, unitary piece connected at a seam 98 formed therebetween. The disengagable connecting means is in the form of a weakened section 11 which may be extruded or otherwise formed along the seam. The weakened section 11 is structured to fracture or tear responsive to expansion of the airbag, thereby enabling the deployed airbag to contact and protect an occupant of the vehicle.

Figure 8:
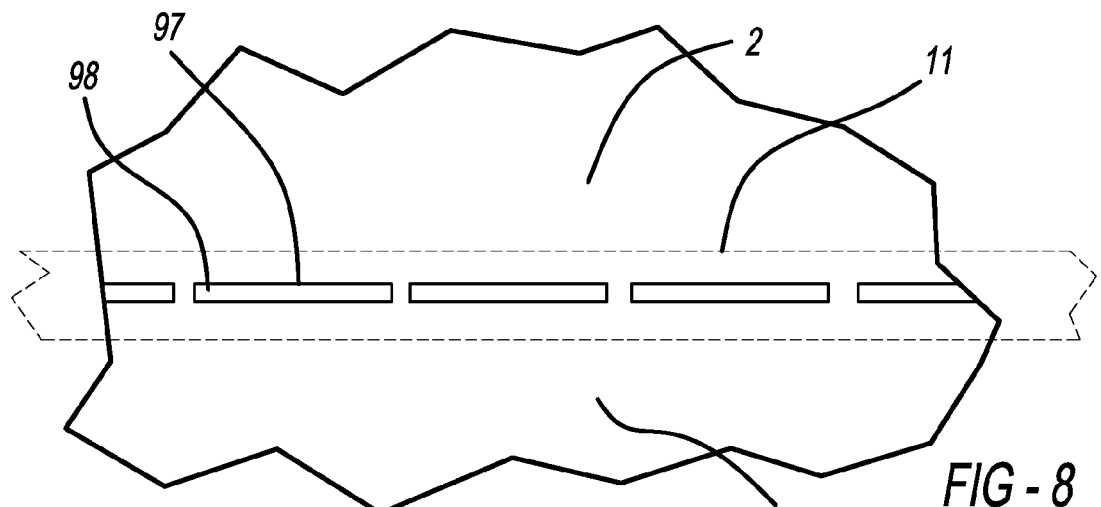
FIG. 8 is a plan view of a portion of an airbag module housing showing another alternative embodiment of a disengagegable connecting means for connecting portions of the housing prior to airbag deployment.

For example, referring to FIG. 8, perforations 97 may be cut along the seam between first portion 2 and second portion 3 after extrusion. The housing material tears along a longitudinal axis of the perforations, thereby opening the housing.

Referring to FIG. 2A, in an alternative embodiment, a weakened portion 150 in the form of a "tear seam" is extruded into the housing during housing formation, at a location where it is desired to form a seam between first and second portions 2 and 3. A relatively thinner wall section t2 is extruded adjacent (and connecting) first and second housing portions 2 and 3, each having a relatively greater wall thickness of t1. The weakened portion 150 is structured to serve as a stress concentration during airbag deployment, so that the housing fractures along the relatively thinner wall section t2 during airbag deployment.

In embodiments such as shown in FIGS. 8 and 2, the respective lengths of first and second portions 2 and 3 may be controlled by adjusting the locations of the housing seam or weakened section formed in the during housing fabrication.

Figure 8A:
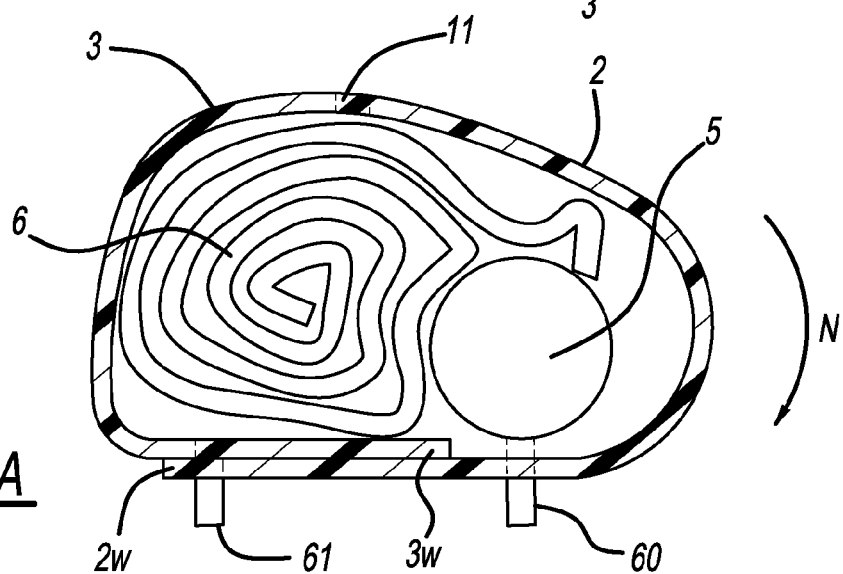
FIG. 8A is a schematic end view of an airbag module fabricated using the housing embodiment shown in FIG. 8.

Referring to FIG. 8A, in one method of assembling an airbag module having a housing with a weakened section, a sheet of flexible housing material is cut to or formed in a predetermined length so as to position the weakened portion 11 at a desired location along an exterior surface of the housing. Ends 2*w* and 3*w* of housing portions 2 and 3 may then be overlapped and secured with respect to each other using, for example, bolts or screws (such as bolts 61) used to attach the module to the vehicle, or using another suitable method.

According to yet another embodiment, the first portion 2 and the second portion 3 may be connected by a clasping mechanism where one or both portions include an adhesive. In this embodiment, the clasping structures previously described may be omitted from the edges of housing portions 2 and 3, if desired.

In yet another embodiment, the first and second portions may be connected using a hook and loop type fastener.

Before deployment of the airbag 6, the disengagable connecting means keeps the first portion 2 and the second portion 3 connected to each other. During a vehicle collision, the airbag 6 deploys, thereby causing the first portion 2 and the second portion 3 to unclasp, unfasten or otherwise separate.

Alternative latching or securement mechanisms for securing the ends of first and second housing portions 2 and 3 in a closed or latched condition are also contemplated, including mechanisms that remain engaged when no expansion forces are exerted on the by the compressed airbag on housing portions 2 and 3 and/or on the particular securement mechanism. These mechanisms are also structured to release or disengage during deployment of the airbag 6, and responsive to the onset of airbag deployment.

In the embodiment shown in FIGS. 1 and 3, housing 25 also includes at least a pair of mounting members 25*m* and 25*n* extending from opposite ends of the body portion 25*a*. In the embodiment shown, each mounting member is located at an intersection of the body portion 25*a* with housing second portion 3. In addition, each mounting member extends along only a portion of a respective end of the body portion 25*a*. Alternatively, one or more mounting members may extend along an entire length or extent of a respective body portion end. In other embodiments, the mounting members may be omitted and the housing may be attached to the vehicle along one or more of body portion 25*a* and first and/or second housing portions 2 and 3.

Each of mounting members 25*m* and 25*n* has a hole or other feature formed therein to facilitate mounting of the housing on a portion of the vehicle using suitable mounting hardware 61 (for example, a fastener such as a nut, screw, or bolt). In the embodiment shown in FIGS. 1 and 3, the central axes of holes 25*m*-1 in mounting member 25*m* and 25*n*-1 in mounting member 25*n* are aligned along a common axis L (FIG. 4). In particular embodiments, the total length L4 of the extrusion (in the direction of extrusion) from which the housing is formed is in the range 6 inches to 60 inches. However, it is seen that, since housing is made using an extrusion process, the extrusion forming the housing may easily be made to any desired length L4 according to the needs of a particular application.

Body portion 25*a* also includes an opening 25*p* structured to permit insertion of a stud, bolt or other retention feature 60 therethrough. The retention feature may be, for example, a fastener such as a nut or screw. Retention feature 60 is attached to inflator 5 and passes through the body portion 25*a* when the airbag module is affixed to the vehicle, to attach the inflator to the vehicle. In addition, because body portion 25*a* is positioned between the inflator 5 and the vehicle, the retention feature also aids in securing the body portion 25*a* to the vehicle. Although a single opening for a single retention feature is shown in FIG. 4, multiple spaced-apart openings may be formed in the body portion to permit the attachment of the inflator and housing to the vehicle using multiple associated retention features.

In the particular embodiment shown in FIG. 4, opening 25*p* is positioned so as to be spaced apart a distance D from axis L along which the mounting member openings 25*m*-1 and 25*n*-1 are formed. In a particular embodiment, opening 25*p* is positioned along an axis S that lies midway between the central axes P and R of openings 25*m*-1 and 25*n*-1. Other arrangements of retention members attaching the housing and/or inflator to the vehicle may also be used, depending on the requirements of a particular application.

Referring to FIG. 3, in another aspect of the embodiments described herein, an airbag module 1 includes an embodiment of housing 25 described herein, and inflator 5 and airbag 6 secured within the housing. A strap 70 may optionally be provided to aid in securing the airbag in a folded position within the housing. Ends of strap 70 may be secured to mounting hardware positioned on mounting members 25*m* and 25*n*, for example. The strap 70 may then extend into the housing interior to help compress and secure the airbag in a pre-deployment configuration.

FIG. 6 is a cross-sectional side view of the airbag module shown in FIG. 1 during deployment of the airbag. One application of an airbag module structured and positioned in the vehicle as shown, is as a knee airbag. During deployment of the airbag 6, the first portion 2 and the second portion 3 flexibly fold outwardly so as to form ramps 2', 3' (representing first and second portions 2 and 3 in a deployed condition of the module). The ramps 2', 3' are structured to guide the airbag 6 into the occupant compartment of the vehicle. During the initial deployment stage of the airbag 6, the airbag exerts forces against the first and second portions 2 and 3, causing both the first portion 2 and the second portion 3 to follow the trajectory as shown by the first arrow 27 and the second arrow 28. The first portion 2 bends and follows the trajectory as shown by the first arrow 27. The second portion 3 bends and follows the trajectory as shown by the second arrow 28 until it contacts and bears against a lower surface of panel 4. As the first portion 2 and the second portion 3 bend, the deploying airbag 6 follows the path created by the ramps 2' and 3'. Also, with one or more of ramps 2' and 3' positioned between the vehicle and the airbag during initial deployment, the ramps may act to prevent snagging of the airbag on portions of the vehicle interior during deployment, According to one embodiment, when the airbag 6 is fully deployed, the first portion after deployment 2' and the second portion after deployment 3' are positioned adjacent to the airbag 6. The first portion after deployment 2' may be positioned between the instrument panel 4 and the airbag 6. The second portion after deployment 3' may be sandwiched between the instrument panel 4 and the airbag 6.

FIG. 9 is a schematic view of a portion of a vehicle occupant protection system 900 installed in a host vehicle 880 and incorporating an airbag module 1 in accordance with an embodiment described herein. In this embodiment, the airbag module 1 is shown mounted on a lower portion of an instrument panel 4 of the vehicle. However, the module 1 may be mounted in any suitable location. In this embodiment of the vehicle occupant protection system 900, a vehicle mounted collision sensor 810 detects contact between the host vehicle 880 and another vehicle (not shown). Responsive to this detected contact, an activation signal is sent to the airbag module 1, resulting in activation of the module gas generator or otherwise releasing pressurized gases into the interior of the airbag 6 (not shown). As the inflator 5 provides gas to the airbag 6, the airbag 6 inflates and deploys. As the airbag 6 is inflated and deploys, the first housing portion 2 disconnects from the second housing portion 3, thereby opening the housing. The airbag 6 then expands to enter the occupant compartment of the vehicle, thereby protecting the occupant during the vehicle collision. As the airbag deploys, ramps 2' and 3' form guide surfaces which direct portions of the airbag in one or more preferred directions during the initial airbag deployment.

Figure 11:
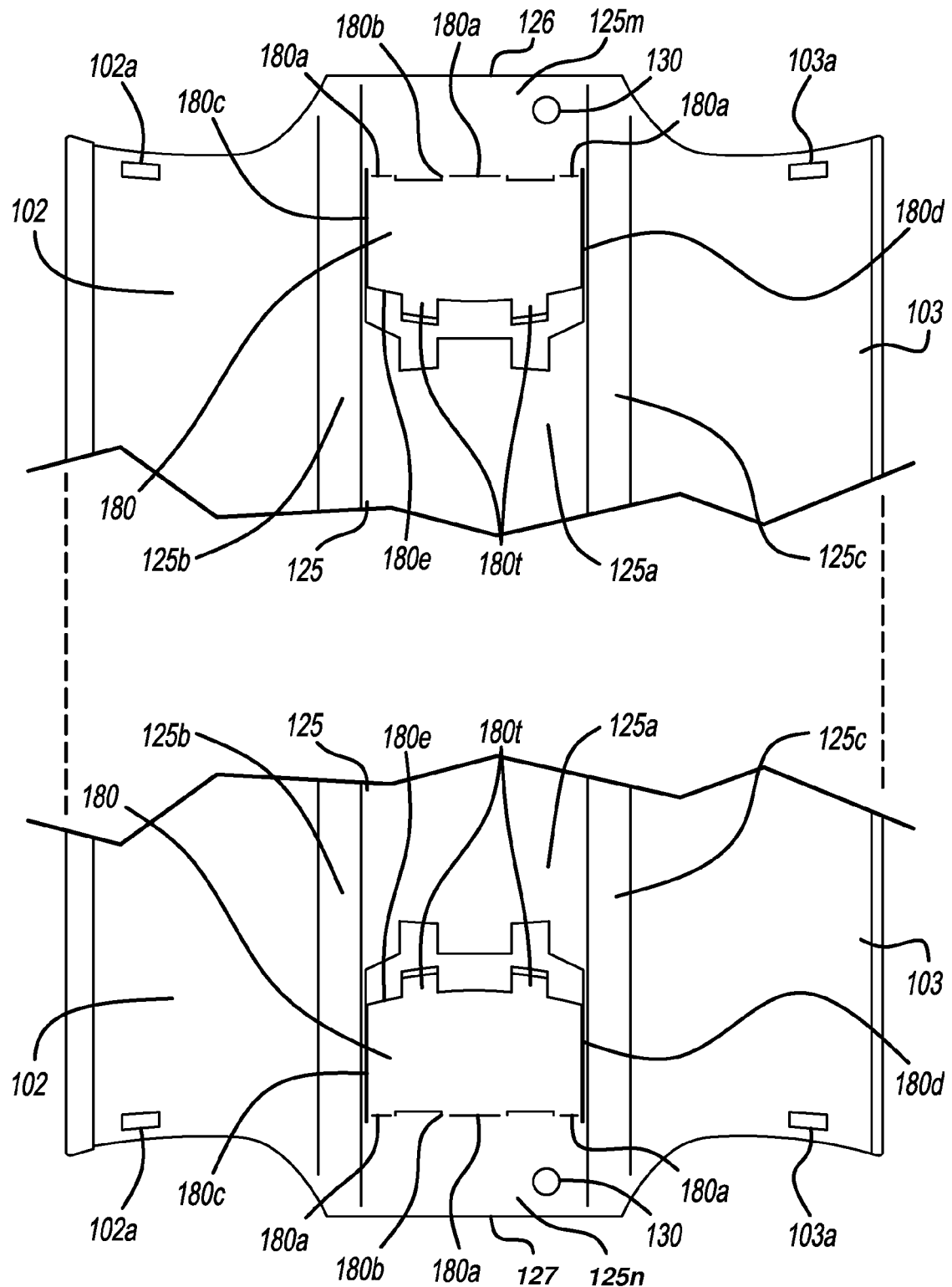
FIG. 11 is a plan view of one embodiment of an airbag module housing prior to assembly.
Figure 12:
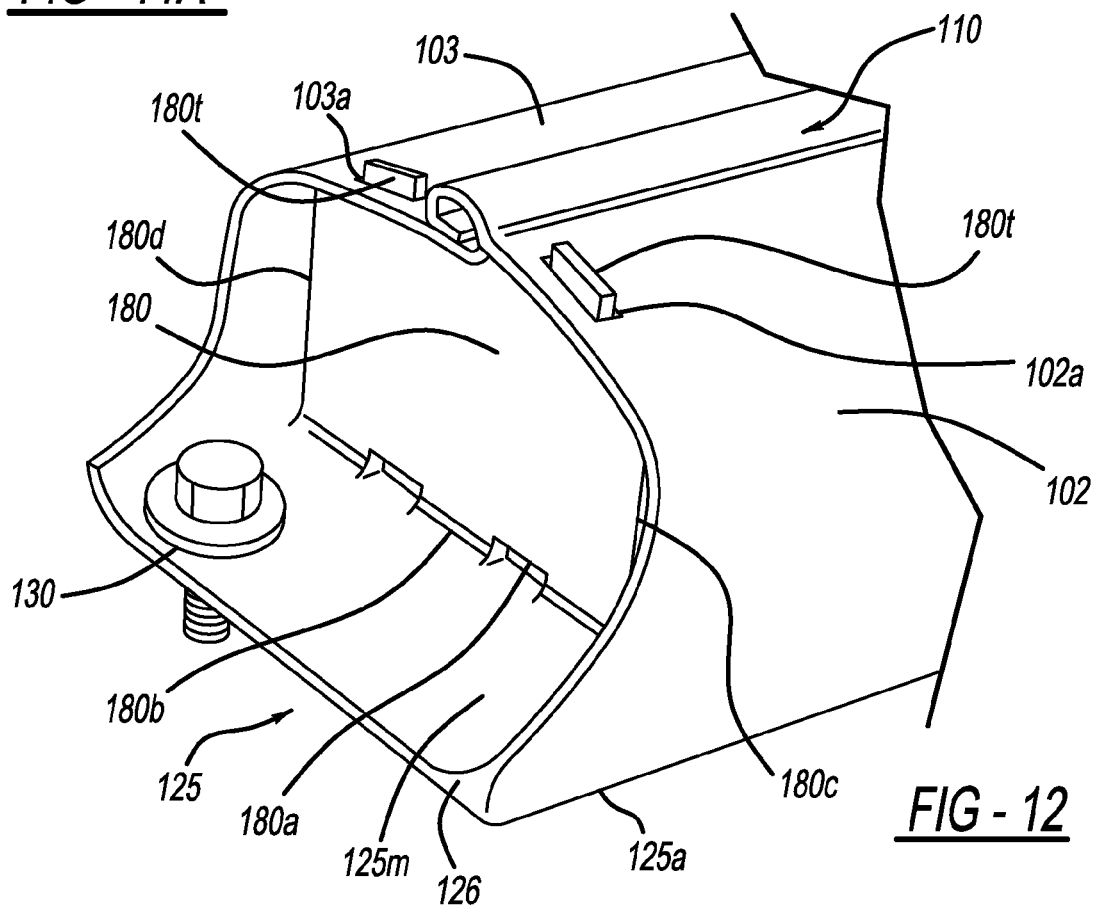
FIG. 12 is a perspective view of the housing end shown in FIGS. 11 and 11A in an assembled condition.

Referring now to FIGS. 11-12, in yet another embodiment and unless otherwise described, a housing 125 has the structural and operational characteristics of embodiments previously described. Housing 125 has a body portion 125*a* and a cover (generally designated 10) extruded integrally with the body portion 25*a* so as to form a single monolithic unit.

Cover 110 includes a first portion 102 extending from a first edge 125*b* of the body portion, and a second portion 103 extending from a second edge 125*c* of the body portion opposite the first edge, as in the previously described embodiments. Either of first portion 102 and second portion 103 may extend along an entire respective edge of body portion 125*a*, or along only a portion of the respective edge. The embodiment shown in FIGS. 11-12 may be mounted to a vehicle (for example, along body portion 125*a* as previously described.

Figure 11A:
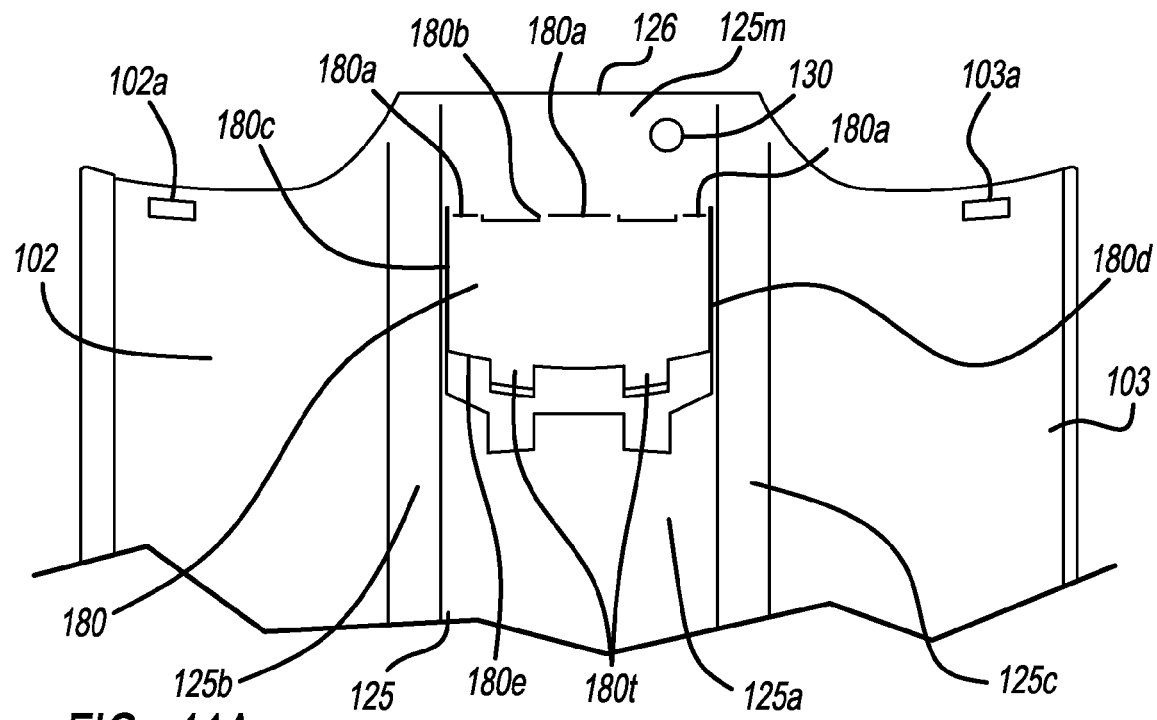
FIG. 11A is a plan view of one end portion of the housing embodiment shown in FIG. 11.

In the embodiment shown in FIGS. 11-12, portions of first and second housing portions 102 and 103 and a section of body portion 125*a* proximate each of opposite longitudinal edges 126 and 127 are cut to the configurations shown in FIGS. 11 and 11A. Housing portions 102 and 103 and foldable flaps 180 (described below) are then folded and secured as described herein to enclose the contents of the housing. The housing material may be cut and/or formed to provide the characteristics shown in the drawings, using any suitable method or methods (for example, stamping dies, laser cutting, molding or any other suitable method). Because the flaps and related structures formed at each of housing ends 126 and 127 have the same configuration, for simplicity, only end 126 of the housing 125 will be described in detail, with reference to FIGS. 11A and 12. However, if desired, a foldable flap and the housing features related thereto may be formed only at a single end of the housing. The embodiment shown in FIGS. 11-12 may be extruded in a shape where housing portions 102 and 103 are already folded and with free edges of the housing portions separated, or the housing may be extruded as a flat sheet, as previously described herein.

Referring to FIGS. 11A and 12, ends of first and second housing portions 102 and 103 adjacent an associated end 126 of body portion 125a are longitudinally recessed from the body portion end so that the body portion end 126 extends relatively farther longitudinally than adjacent ends of first and second housing portions 102 and 103. This relative outward extension of the body portion end 126 provides an associated mounting member 125m used for mounting the housing to a vehicle as previously described, when first portion 102, second portion 103 and flap 180 are folded in the manner described below.

Each of the mounting members 125m and 125n (shown in FIG. 11) has a hole 130 or other feature formed therein to facilitate mounting of the housing on a portion of the vehicle using suitable mounting hardware (for example, a fastener such as a nut or screw) as previously described. In the embodiment shown in FIGS. 11A and 12, hole 130 is offset laterally toward one side of the mounting member. However, one or more holes may be located at any desired location along any mounting member.

A foldable flap 180 is provided by cutting through the thickness of the housing material along a desired outline shape of the flap, as shown in FIG. 11A. Sections 180a of intact or uncut material are interspersed between adjacent cut portions to provide hinge portions by which the flap 180 is foldably attached to the housing body portion 125a. Flap 180 has a body edge 180b along which the flap is attached to the housing body portion 125a. A pair of opposed side edges 180c and 180d extend from body edge 180b and terminate in a free edge 180e. Free edge 180e resides opposite body edge 180b and includes at least one tab 180t extending therefrom. In the embodiment shown, a pair of spaced apart tabs extend from free edge 180e.

Also, as seen in FIGS. 11A and 12, a window 102a is formed proximate an end of housing first portion 102, and a window 103a is formed proximate an end of housing second portion 103. Each of windows 102a and 103a is sized to enable a respective one of flap tabs 180t to be received therein when first portion 102, second portion 103 and flap 180 are folded in the manner described below. Similarly, the lengths of flap side edges 180c and 180d, the positions of tabs 180t along free edge 180e, and the positions of windows 102a and 103a along first and second housing portions 102 and 103 are specified such that each tab 180t may be received in a respective one of windows 102a, 103a when first portion 102, second portion 103 and flap 180 are folded in the manner described below.

Referring to FIGS. 11A and 12, during assembly of the housing, flap 180 at each end of the housing is folded out of the plane of the body portion 125a, thereby forming an associated housing end wall at each end of the housing. The contents of the housing (inflator, airbag, etc.) may then be positioned within the housing. Then, housing first and second portions 102 and 103 are folded over to enclose the housing contents as previously described. First and second portions 102 and 103 are folded in directions toward the previously-folded flap 180. Each of housing portions 102 and 103 folds along a respective side edge 180c or 180d of the flap 180 and along flap free edge 180e until each of windows 102a, 103a overlies a respective one of tabs 180t. The first and second portions 102 and 103 may then be pressed onto flap free edge 180e to insert each of tabs 180t into one of windows 102a, 103a. At this time, a disengagegable connecting means (as previously described) positioned along the free edges of the housing first and second portions 102 and 103 may also be engaged to secure the housing in a closed position.

The disengagegable connecting means maintains the first and second housing portions 102 and 103 in the closed position of the module housing. This maintains the tabs 180t in position within windows 102a, 103a which, in turn, maintains flap 180 in its folded position. In this configuration, the foldable flaps 180 at the ends of the housing form end walls of the housing, to close the ends of the housing.

During deployment of the airbag, the first and second housing portions 102 and 103 become disengaged from each other as previously described, and the housing portions also become disengaged from tabs 180t, thereby releasing the free edge 180e of flap 180.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A housing for an airbag module, the housing comprising:
    an extrusion incorporating a body portion and a cover extruded integrally with the body portion so as to form a single monolithic unit; and
    at least one foldable end wall formed proximate an end of the housing,
    wherein the cover is closable to a closed condition structured to engage a portion of the at least one end wall so as to maintain the at least one end wall in a folded condition when the cover is in the closed condition.

2. The housing of claim 1 wherein the cover comprises a flexible first portion connected to a first edge of the body portion, and a flexible second portion connected to a second edge of the body portion opposite the first edge.

3. The housing of claim 2 wherein the first and second housing portions are structured to be foldable toward each other, and wherein the at least one end wall is structured to be foldable away from a plane of the body portion and toward the first and second housing portions when the first and second housing portions are folded toward each other.

4. The housing of claim 2 further comprising disengagegable connecting means structured to connect the first portion and the second portion along a seam formed therebetween.

5. The housing of claim 4 wherein the disengagegable connecting means comprises a hook and loop type fastening system.

6. The housing of claim 4 wherein the disengagegable connecting means comprises an adhesive material.

7. The housing of claim 1 wherein the extrusion is formed from Adflex KSO21P Polyolefin.

8. An airbag module including a housing in accordance with claim 1.

9. A vehicle occupant protection system including an airbag module in accordance with claim 8.

10. A vehicle including an airbag module in accordance with claim 8.

11. The housing of claim 1 wherein the body portion has a pair of opposite ends, and wherein the housing further comprises a mounting member extending from each end of the pair of ends.

12. The housing of claim 1 wherein the at least one end wall is formed from the housing body portion.

13. The housing of claim 1 wherein the at least one end wall is structured to form an end wall of the housing when the housing is in a closed condition.

14. A housing for an airbag module, the housing comprising:
- an extrusion incorporating a body portion and a cover extruded integrally with the body portion so as to form a single monolithic unit; and
- at least one foldable end wall formed proximate an end of the housing,
- wherein the cover comprises a flexible first portion connected to a first edge of the body portion, and a flexible second portion connected to a second edge of the body portion opposite the first edge;
- wherein the at least one end wall is structured to engage at least one of the first housing portion and the second housing portion when the housing is in a closed condition, and
- wherein the at least one end wall includes at least one tab extending from an edge of the at least one end wall, and wherein a window is formed in at least one of the first and second housing portions, the window bring structured to teceive the at least one tab therein when the housing is in a closed condition.

15. A housing for an airbag module, the housing comprising:
- an extrusion incorporating a body portion and a cover extruded integrally with the body portion so as to form a single monolithic unit; and
- at least one foldable end wall formed proximate an end of the housing,
- wherein the cover comprises a flexible first portion connected to a first edge of the body portion, and a flexible second portion connected to a second edge of the body portion opposite the first edge;
- the housing further comprising disengagegable connecting means structured to connect the first portion and the second portion along a seam formed therebetween,
- wherein the disengagegable connecting means comprises a clasping mechanism formed along an edge of at least one of the first portion and the second portion, the clasping mechanism being structured to engage a portion of the other one of the first portion and the second portion to form a connection therebetween.

16. A housing for an airbag module, the housing comprising:
- an extrusion incorporating a body portion and a cover extruded integrally with the body portion so as to form a single monolithic unit; and
- at least one foldable end wall formed proximate an end of the housing, wherein the body portion has a pair of opposite ends, and wherein the housing further comprises a mounting member extending from each end of the pair of ends,
- wherein an end of the first housing portion adjacent an associated end of the body portion is longitudinally recessed with respect to the body portion end so that the body portion end extends relatively farther longitudinally than the adjacent end of the first housing portion,
- and wherein an end of the second housing portion adjacent the end of the body portion is longitudinally recessed with respect to the body portion end so that the body portion end extends relatively farther longitudinally than the adjacent end of the second housing portion,
- such that the body portion end adjacent the recessed first and second housing portion ends forms a mounting member of the housing.

17. A housing for an airbag module, the housing comprising:
- an extrusion incorporating a body portion and a cover extruded integrally with the body portion so as to form a single monolithic unit;
- at least one foldable flap formed proximate an end of the housing; and
- means formed on the at least one flap and on the cover for securing the at least one flap in a folded condition when the cover is in a closed condition, such that the at least one flap forms and end wall of the housing.

18. An airbag module including a housing in accordance with claim 17.

19. A vehicle occupant protection system including an airbag module in accordance with claim 18.

20. A vehicle including an airbag module in accordance with claim 18.

* * * * *

UNITED STATES PATENT AND TRADEMARK OFFICE
CERTIFICATE OF CORRECTION

PATENT NO. : 9,193,324 B2  
APPLICATION NO. : 14/311815  
DATED : November 24, 2015  
INVENTOR(S) : Osterfeld Page 1 of 1

It is certified that error appears in the above-identified patent and that said Letters Patent is hereby corrected as shown below:

In the Claims:

Column 11; Line 33, Claim 14; Please delete "teceive" and insert --receive--

Signed and Sealed this  
Twenty-third Day of February, 2016

Michelle K. Lee  
*Director of the United States Patent and Trademark Office*